J. H. WIEST.
COMBINATION CONCRETE MOLDING MACHINE.
APPLICATION FILED JUNE 29, 1908.

939,118.

Patented Nov. 2, 1909.
3 SHEETS—SHEET 1.

WITNESSES:
J. H. Gardner
H. R. Woddell

INVENTOR:
Jonas H. Wiest,
BY
E. T. Silvius,
ATTORNEY.

J. H. WIEST.
COMBINATION CONCRETE MOLDING MACHINE.
APPLICATION FILED JUNE 29, 1908.
939,118.
Patented Nov. 2, 1909.
3 SHEETS—SHEET 2.
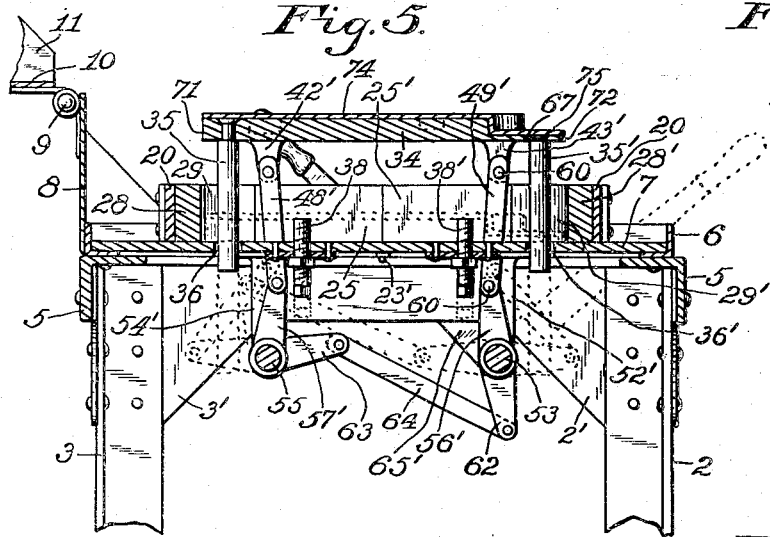
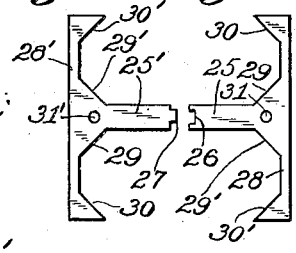
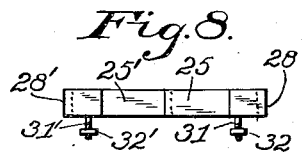
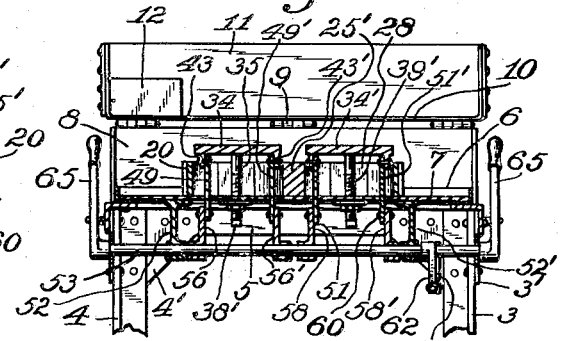
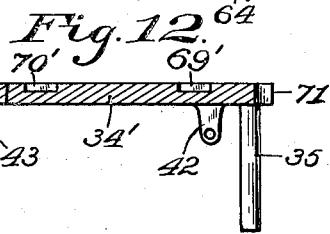
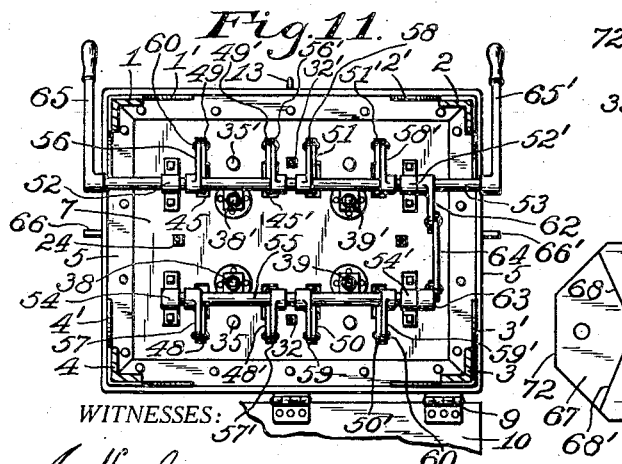
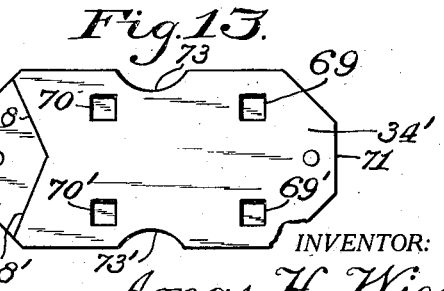
WITNESSES:
J. H. Gardner
K. R. Woddell
INVENTOR:
Jonas H. Wiest,
BY
E. T. Silvius,
ATTORNEY.

J. H. WIEST.
COMBINATION CONCRETE MOLDING MACHINE.
APPLICATION FILED JUNE 29, 1908.
939,118.
Patented Nov. 2, 1909.
3 SHEETS—SHEET 3.
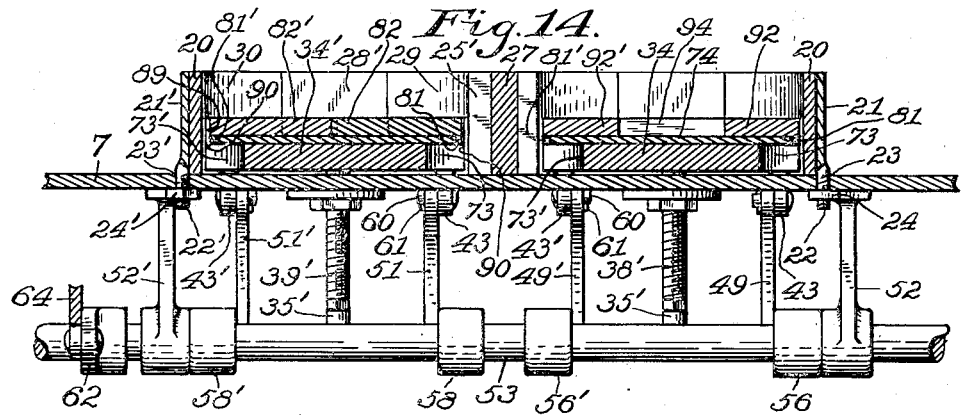
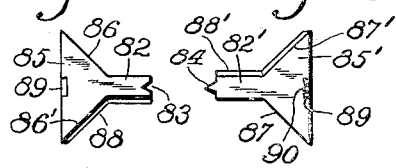
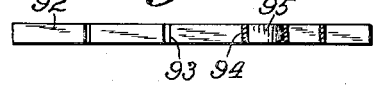
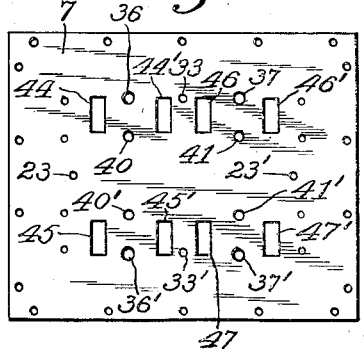
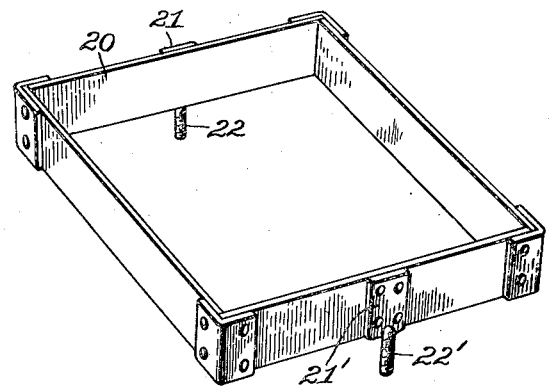
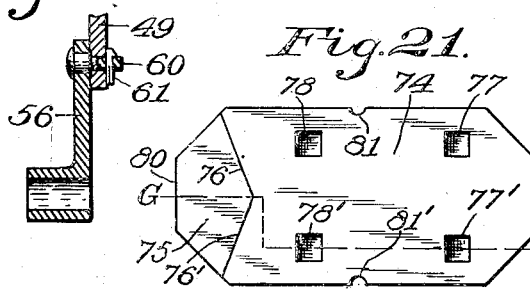
WITNESSES:
J. H. Gardner
K. R. Woddell
INVENTOR:
Jonas H. Wiest,
BY
E. T. Silvius,
ATTORNEY.

UNITED STATES PATENT OFFICE.

JONAS H. WIEST, OF INDIANAPOLIS, INDIANA, ASSIGNOR TO INDIANA CONCRETE FORM CO., OF INDIANAPOLIS, INDIANA, A CORPORATION OF INDIANA.

COMBINATION CONCRETE-MOLDING MACHINE.

939,118.  Specification of Letters Patent.  Patented Nov. 2, 1909.

Application filed June 29, 1908. Serial No. 440,913.

*To all whom it may concern:*

Be it known that I, JONAS H. WIEST, a citizen of the United States, residing at Indianapolis, in the county of Marion and State of Indiana, have invented certain new and useful Improvements in Combination Concrete-Molding Machines; and I do declare the following to be a full, clear, and exact description of the invention, reference being had to the accompanying drawings, and to the letters and figures of reference marked thereon, which form a part of this specification.

This invention relates to machines and apparatus for forming plastic material into a variety of shapes, and it has reference more particularly to a machine for molding concrete shingles, floor tiling or blocks, paving blocks, etc.

The object of the invention is to provide apparatus whereby concrete may be expeditiously molded in various shapes and in an improved manner by the unskilled, and to provide apparatus of the above mentioned character that may be produced at much less cost than separate machines for molding different forms could be produced, a still further object being to provide a combination machine that will be adapted to be used by the small producer and serve the purpose of a variety of machines.

The invention consists in a combination molding machine and apparatus comprising sectional interchangeable mold forms, a frame for supporting the forms, apparatus for separating the products from the forms, all of novel construction and arrangement; and, consisting further in the parts, and combinations and arrangements of parts, as hereinafter particularly described and defined in the appended claims.

Figure 1:
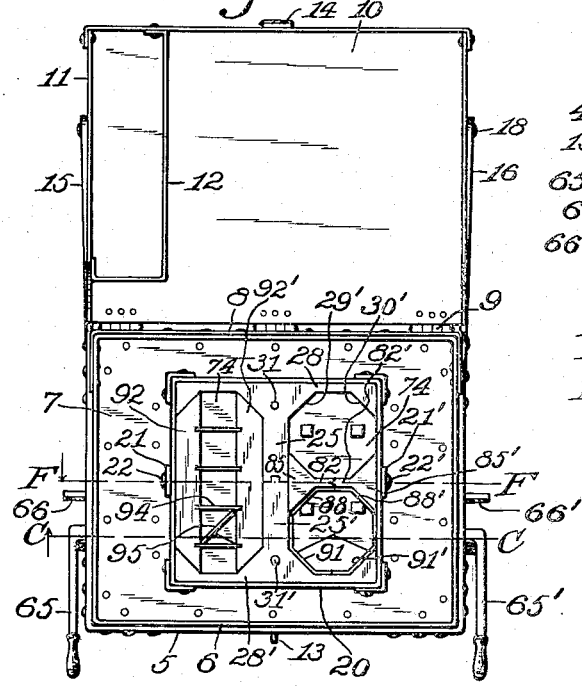
Figure 2:
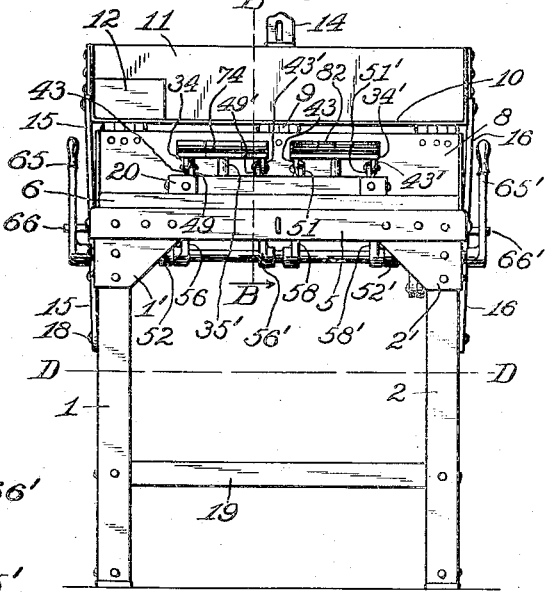
Figure 3:
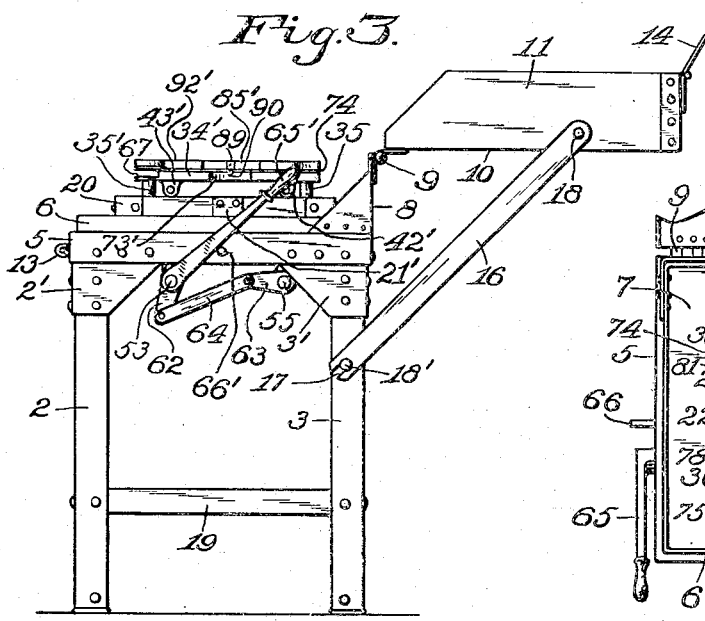
Figure 4:
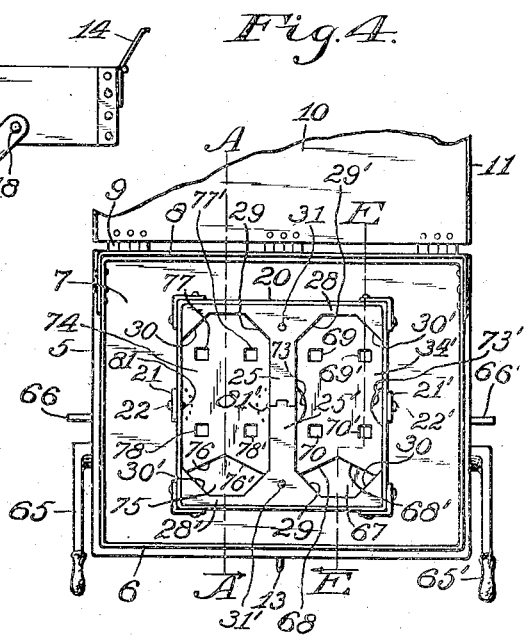

Referring to the drawings Figure 1 is a top plan view of the machine with its cover thrown back as when prepared to begin molding operations; Fig. 2, a front elevation of the machine with the product elevators in their higher positions; Fig. 3, a side elevation of the machine adjusted as in the preceding figure; Fig. 4, a fragmentary top plan of the machine adjusted as in Fig. 1, but with parts of the forms removed; Fig. 5, a fragmentary vertical sectional view on the line A—A in Fig. 4; Figs. 6 and 7, top plans of two partitional form parts for shaping shingles or blocks; Fig. 8, an elevation of the two form parts shown in the two preceding figures connected together; Fig. 9, a fragmentary vertical sectional view at the plane of the line B—B in Fig. 2; Fig. 10, a fragmentary vertical sectional view on the line C—C in Fig. 1; Fig. 11, a horizontal sectional view at the plane of the line D—D in Fig. 2 inverted; Fig. 12, a vertical sectional view of one of the product elevators taken on the plane of the line E—E in Fig. 4; Fig. 13 a top plan of the elevator; Fig. 14, a fragmentary vertical sectional view on the line F—F in Fig. 1; Fig. 15, a top plan of a mold form used in producing octagonal paving blocks; Fig. 16, a companion form shown in inverted position; Fig. 17, a sectional elevation of a mold form used in producing square or rectangular blocks; Fig. 18, a top plan of the work table portion of the machine; Fig. 19, a perspective view of the mold form with which other mold forms are associated to produce different shapes of product; Fig. 20 a sectional detail of operating parts of the machine; Fig. 21, a top plan of one of the pallets used in the machine; Fig. 22, a sectional view of the pallet on the line G—G in Fig. 21; and Fig. 23, a fragmentary vertical sectional view at the plane of the line C—C in Fig. 1.

Similar reference characters throughout the various figures of the drawings indicate corresponding elements or features of construction referred to herein.

A practical embodiment of the invention comprises a stand having four legs 1, 2, 3, 4, composed preferably of angle-iron bars, the upper portions of the legs having braces 1', 2', 3', 4', secured thereto, a rectangular main frame 5 being secured to the braces on the tops of the legs. A rectangular table frame 6 is secured on the top of the main frame, and a rectangular work table 7 is secured in the table frame, so that the table frame forms an upward extending rim around the edge of the work table. A back plate 8 is secured to the rear portions of the table frame and has hinges 9 secured thereto to which a cover 10 is attached, the cover including a side flange 11 adapted to rest on the main frame 5 when the cover is moved forward on its hinges so as to cover the work table when the machine is not in use. When using the machine the cover is thrown back as shown, so as to be inverted and forms a tray wherein the tools may be conveniently placed, a box 12 being provided for holding small articles. The main frame is provided with a staple 13 at the front thereof and the cover is provided at its free end with a hasp 14 to engage the staple so that the cover may be locked when the machine is not in use or while being shipped. The cover is provided with two props 15 and 16 each having a slot 17 in one end thereof, the opposite end of each prop being connected by a pivot 18 to the cover, the legs 3 and 4 having projections 18' that are engaged by the slotted ends of the props when the cover is thrown back. The legs of the stand are connected at their lower portions by rails 19.

A main mold form 20 is formed and it is provided with lugs 21 and 21' having screw-bolts 22 and 22' formed thereon that extend through holes 23 and 23' formed in the table 7, the bolts having nuts 24 and 24' thereon whereby the mold form is secured removably on the top of the table. The form is rectangular, but may be made in other shapes and has other mold form parts associated therewith, in order to mold various shapes of product. In some cases, however, the mold form 20 may be filled with the plastic material to form a paving slab or block the full size of the form in plan. In order to adapt the machine for molding articles of smaller sizes, a partitional form is provided which divides the space in the form 20 into two sections and comprises two T-shaped parts, one part having a stem 25 in the end of which is a groove 26 and the other part having a stem 25' on the end of which is a tongue 27 to enter the groove 26, the stems being joined together at the middle of the space in the form 20 and resting on the table 7. One stem has a cross-arm 28 thereon and the other stem has a cross-arm 28' thereon, the cross-arms being alike and extending against opposite walls of the form 20. Each part of the partitional form has an angular vertical face 29 and an angular face 29' at the junction of the arm with the stem of the part, the ends of the arm having angular faces 30 and 30', the arms and angular faces being adapted to shape the ends of shingles or octagonal paving blocks. The parts are provided with securing bolts 31 and 31' on which are nuts 32 and 32' for securing the parts on the top of the table, the latter having bolt holes 33 and 33' therein to receive the bolts. With this arrangement of the forms two roofing shingles or two oblong paving blocks may be molded with their ends formed each with three angles of octagons.

In order to remove the products from the mold forms two elevators 34 and 34' are provided which correspond in plan to the contours of the walls of the forms above described, the elevators being arranged above the table 7 in the spaces in which the articles are molded, the elevators being alike and having each a pair of guide-bars 35 and 35' on the under side thereof, and the table 7 has two pairs of guideways 36 and 36' and 37 and 37' in which the guide-bars operate vertically. The elevators may be variously shaped in plan other than above mentioned. The elevators are normally supported by adjusting-screws 38 and 38' and 39 and 39' mounted in the table 7 in which are suitable holes 40 and 40' and 41 and 41', there being two screws for each elevator and adjustable vertically so as to support the elevator in different planes relatively to the plane of the top of the form 20 so as to govern the thickness of the product. The under side of each elevator has four ears 42 and 42' and 43 and 43' for moving it and supporting it in its higher position, the ears passing through apertures 44, 44', 45, 45' 46, 46', 47, 47' in the table 7 when the elevators are at their lowermost positions. Each ear has a connecting rod suitably pivoted thereto, there being four rods 48, 48', 49, 49', for one elevator and four rods 50, 50', 51, 51' for the other elevator.

The gearing for moving and controlling the elevators comprise two hangers 52 and 52' that are attached to the under side of the table 7, a main shaft 53 mounted in the hangers rotatively, two other hangers 54 and 54' attached also to the under side of the table and in which a shaft 55 is mounted rotatively, the shaft 53 having two arms 56, 56', and the shaft 55 having two arms 57, 57' secured thereto to which are pivoted the connecting rods of one of the elevators, the shaft 53 having also two similar arms 58, 58', and the shaft 55 having also two similar arms 59, 59' secured thereto to which are pivotally connected the rods of the other elevator. The pivots by which the connecting rods are pivoted to the arms and also to the ears of the elevators preferably comprise each a pin 60 extending through two of the parts and provided with a key 61 securing the pivot pin in one of the parts so as to be free to rotate in the companion part as shown in Fig. 20, so that the connecting rods may be easily disconnected from the arms to remove the elevators so that other elevators may be substituted therefor if desired. The shaft 53 has an arm 62 secured thereto, and the shaft 55 has an arm 63 attached thereto, and a connecting rod 64 is pivoted at its ends to the ends of the two arms 62 and 63 so that when the main shaft is moved rotatively the shaft 55 will also be moved rotatively, but in opposite direction, the shaft 53 being provided at its ends with operating levers 65 and 65' that are stopped by projections 66 and 66' on the main frame 5 when moved so as to bring the elevators to their higher positions, but it should be understood, however, that either one of the levers may be dispensed with if desired.

The uppermost face of each elevator may have any desired configuration, but for the purpose of manufacturing improved shingles one end of each elevator has a depressed surface 67 extending from shoulders 68 and 68' arranged at angles one to another so that sheet metal pallets may be placed on the elevators to mold shingles having thickened ends, the opposite end portion of each elevator having two recesses 69 and 69' and the body portion having two recesses 70 and 70' in the upper portions thereof, the ends 71 and 72 of the elevator being formed in the present case with three angular faces each conforming to the octagonal contours but, of course, the ends may be variously shaped otherwise. The middle portions of the elevator have relatively large notches 73 and 73' in the edges thereof to afford clearance space for the hands of the operator to lift the pallets from the elevators.

A suitable number of pallets 74 are provided to be used with each machine, all the pallets being alike and formed of sheet metal, one end portion of each pallet being offset so as to form a depressed part 75 at the top thereof extending from shoulders 76 and 76' so that a shingle having a thickened end part can be formed thereon, the top of the pallet having depressions 77 and 77' and 78 and 78'; the ends 79 and 80 being in the present case shaped to conform to octagonal contours, and, of course, the ends may be otherwise shaped if desired. The middle portions of the pallet have small notches 81 and 81' in the edges thereof. In some cases the pallets may be used in inverted positions when it is desired to mold paving blocks thereon.

In order to adapt the machine for molding octagonal shapes of blocks a partitional form is provided that comprises two parts, one part having a stem 82 in the end of which is a groove 83, and the other part comprising a stem 82' having a tongue 84 to enter the groove, one stem having a broad end 85, and the other stem having a broad end 85', one end having angular faces 86 and 86', and the other one having angular faces 87 and 87'. One side of one part has a horizontal rib 88 and the other one a similar rib 88' and each broad end has a plate 89 secured thereto on which is a dowel 90 projecting downward into either notch 81 or 81', the parts being placed on the pallet so as to extend across the middle portion thereof with one broad end against the stems 25 and 25' and the other broad end against the opposite wall of the mold form 20, thus dividing the space for a shingle into two equal spaces for molding octagonal floor tiling or blocks as shown particularly in Fig. 1. A horizontal rib form 91 is placed against the stem 25' and the cross-arm 28' against the rib 88, and another rib form 91' is placed against the inner side of the form 20 and against the cross-arm 28' extending to the rib 88', so that a groove may be formed in the edge of a paving block by the rib forms. It should be understood, however, that the forms may be so modified as to form the edges of the blocks otherwise, and also additional rib forms may be provided so that grooves may be formed in the edges of all of the blocks. In the other space above described for molding a shingle, two filling blocks 92 and 92' are inserted on the pallet and have each a suitable number of vertical slots 93 in the inner side thereof in which are inserted removable partitions 94, so that square paving blocks may be molded, and a diagonal partition 95 is also inserted between two of the other partitions so that triangular corner pieces may be molded. Various other shapes of forms, of course, may be provided for changing the plan contours of the blocks.

In practical use the operating levers are drawn forward until the elevators rest upon the adjusting-screws, and the screws are first adjusted so that blocks or shingles of the desired thickness may be produced with the top thereof in the plane of the top of the form 20, a pallet being placed on top of each elevator, and then the partitional forms having the stems 82 and 82' are placed on the pallets if it is desired to mold octagonal blocks, but are not used when it is desired to mold shingles. The plastic material is then placed on the pallets and having been suitably tamped is struck off even with the top of the form 20 and preferably troweled on the top thereof. The material when properly prepared will immediately set sufficiently for removal and then the operating levers are moved rearward so as to cause the elevators to rise from the stationary mold-form or forms, after which the pallets with the products therein are lifted by hand from the elevators and carried away to suitable places to remain until the products have sufficiently hardened to be removed from the pallets. In case the octagonal blocks and the smaller square blocks are molded the forms described for their production are removed from the pallets after having been elevated from the stationary forms.

Having thus described the invention, what is claimed as new, is—

1. A molding machine including a table having guideways and also bolt-holes therein, a main mold form on the table having a plurality of lugs secured rigidly thereto that have bolts thereon extending through bolt holes and securing the mold form rigidly to the table, a partitional mold form in the main mold form in engagement with two opposite sides thereof, bolts entering bolt-holes and securing the partitional mold form rigidly to the table, two elevators movable vertically in the main mold form at opposite sides of the partitional mold form, guide-bars on the elevators extending into the guideways, means for moving the elevators, and angular mold forms secured rigidly in the main mold form at opposite sides of the partitional mold form and extending across opposite ends of the elevators.

2. A molding machine including a table, a main mold form secured rigidly on the table, a partitional mold form secured on the table and engaging opposite sides of the main mold form, the partitional mold form having two cross-arms on opposite ends thereof engaging the opposite sides of the main mold form and extending to the other sides thereof, two elevators mounted to move vertically in the main mold form at opposite sides of the partitional mold form and between the cross-arms thereof, means for moving the elevators, pallets seated removably on the elevators, two filling blocks on one of the pallets and extending substantially to the cross-arms, one block being against the main mold form and the other block against the partitional mold form, the blocks having slots therein, and partitions on said pallet and extending into the slots in the blocks.

3. A molding machine including a table, a main mold form secured on the table, a partitional mold form secured on the table and engaging opposite sides of the main mold form, two elevators mounted movably within the main mold form at opposite sides of the partitional mold form and having each a pallet thereon, each pallet having notches in opposite sides thereof, a sectional partitional mold form on one of the pallets and engaging the secured partitional mold form and also the main mold form and provided with dowels that extend into the notches, an operating shaft mounted rotatively under the table, and means connected with the shaft and also with the two elevators for raising the elevators and the pallets and also the sectional partitional mold form above the plane of the top of the main mold form.

4. A molding machine including a table, a main mold form secured on the table, a partitional mold form secured on the table and engaging opposite sides of the main mold form and having a cross-arm engaging another side of the main mold form, two elevators mounted movably within the main mold form at opposite sides of the partitional mold form and having each a pallet thereon, a sectional partitional mold form on one of the pallets and engaging the secured partitional mold form and also the main mold form, a horizontal rib form on one side of the sectional partitional mold form, a horizontal rib form extending against one side of the secured partitional mold form and the cross-arm, a horizontal rib form extending against the cross-arm and also against the main mold form, the rib forms being joined together, and means for raising and supporting the two elevators above the plane of the top of the main mold form.

5. A molding machine including a plurality of legs having each a brace attached to the top thereof, a main frame attached to the braces, a table-frame secured on the top of the main frame, a table secured in the table-frame and having a plurality of guideways therein, a main mold form secured on the table, a partitional mold form comprising two parts having each a stem and a cross-arm, the stems being joined together and the cross-arms engaging opposite sides of the main mold form, bolts securing the two parts of the partitional mold form removably to the top of the table, two elevators mounted within the main mold form at opposite sides of the partitional mold form between the cross-arms and having each a plurality of guide-bars thereon extending movably through a plurality of the guide-ways, means for normally supporting the elevators adjustably in a plane below the tops of the mold forms, and means for raising and supporting the elevators above the plane of the tops of the mold forms.

6. A combination concrete molding machine comprising a main frame, a table mounted on the main frame, hangers attached to the under side of the table, a main mold form secured to the top of the table, a fixed partitional mold form secured to the top of the table and engaging opposite sides of the main mold form, two elevators mounted within the main mold form, each elevator having a plurality of ears on the under side thereof provided each with a pivoted connecting-rod, a pair of shafts mounted rotatively in the hangers and connected operatively together and having arms thereon pivoted to the connecting-rods of the ears, a pallet mounted removably on one of the elevators and having a pair of filling blocks thereon having each a plurality of slots therein, one filling block engaging the main mold form and the other filling block engaging the partitional mold form, partitions on the pallet extending into the slots of the filling blocks, and a pallet mounted removably on the other one of the elevators and having a sectional partitional mold form thereon engaging the main mold form and also the fixed partitional mold form.

7. In a molding machine, the combination with a table, and gearing mounted under the table, of a main mold form secured rigidly on the top of the table, a partitional mold form secured rigidly on the top of the table within the main mold form and having cross-arms thereon to form parts of octagons, two elevators mounted movably in the main mold form at opposite sides of the partitional mold form, operating connections between the gearing and the elevators, pallets seated removably on the elevators, sectional mold forms on one of the pallets to coöperate with the cross-arms for forming two octagonal blocks on the pallet, and sectional mold forms on the other pallet coöperating with the main mold form and the partitional mold form and cross-arms thereof to form a plurality of square blocks.

8. In a molding machine, the combination with a table, a main mold form secured on the table, and a pair of elevators mounted movably above the table in the main mold form, of a partitional mold form secured on the table between the elevators and having cross-arms extending along opposite sides of the main mold form at opposite ends of the elevators, pallets on the elevators, and sectional mold forms on one of the pallets and comprising two filling blocks each having slots therein, one filling block engaging the main mold form and portions of the cross-arms and the other block engaging the partitional mold form and portions of the cross-arms thereof, and partitional forms on the said pallet extending into the slots.

9. In a molding machine, the combination of a table having a guideway therein, a mold form secured immovably on the table, an elevator mounted movably in the mold form and having a guide-bar on the under side thereof extending movably into the guideway, gearing mounted under the table and connected with the elevator, and a pallet seated removably on the elevator and having two opposite sides thereof extending laterally beyond two opposite side portions of the elevator.

10. In a molding machine, the combination with a table, a mold form on the table, and an elevator mounted movably in the mold form, of a pallet seated removably on the elevator and comprising a plate having a depression in its top at one end thereof and a plurality of depressions in other portions thereof, the pallet extending laterally beyond two opposite side portions of the elevator.

11. In molding apparatus, the combination with a table, a mold form secured on the table, and gearing mounted under the table, of an elevator mounted movably above the table in the mold form and having a recess in each one of two opposite sides thereof, the elevator being connected with the gearing, and a pallet seated removably on the top of the elevator and extending over the recessed portions thereof.

12. In a molding machine, the combination with a table, a main mold form secured on the table, and an elevator mounted movably in the mold form, of a pallet seated removably on the elevator and having a partitional mold form seated removably thereon, said partitional mold form comprising two parts joined together and extending to opposite sides of the main mold form.

In testimony whereof, I affix my signature in presence of two witnesses, on the 26th day of June, 1908.

JONAS H. WIEST.

Witnesses:
E. T. SILVIUS,
J. H. JORDAN.